United States Patent [19]
Rydmann et al.

[11] Patent Number: 5,375,991
[45] Date of Patent: Dec. 27, 1994

[54] MECHANISM FOR THE AUTOMATIC MANUFACTURING OF ARTICLES MADE FROM PLASTIC, PARTICULARLY FROM RECYCLABLE PLASTIC

[75] Inventors: Theo Rydmann, Hettenleidelheim; Giuseppe Attilo, Grünstadt; Manfred Schibalsky, Worms-Hernsheim, all of Germany

[73] Assignee: Spies Kunststoff-Recycling GmbH Company, Germany

[21] Appl. No.: 4,585

[22] Filed: Jan. 14, 1993

[30] Foreign Application Priority Data

Apr. 8, 1992 [DE] Germany ............................ 4211768
Aug. 14, 1992 [DE] Germany ............................ 4227031

[51] Int. Cl.⁵ .................... B29C 45/23; B29C 45/66; B29C 45/78
[52] U.S. Cl. .................................. 425/144; 425/146; 425/147; 425/165; 425/166; 425/550; 425/556; 425/562; 425/589; 425/595; 425/450.1; 425/451.9; 264/DIG. 69
[58] Field of Search ........... 264/40.5, 328.8, DIG. 69; 425/144, 146, 147, 165, 550, 556, 595, 450.1, 166, 562, 589, 451.9, DIG. 46

[56] References Cited

U.S. PATENT DOCUMENTS

| | | | |
|---|---|---|---|
| 4,318,874 | 3/1982 | Lemelson | 264/328.8 |
| 4,738,808 | 4/1988 | Hammer et al. | 264/DIG. 69 |
| 4,797,237 | 1/1989 | Hammer et al. | 264/DIG. 69 |
| 4,824,627 | 4/1989 | Hammer et al. | 264/DIG. 69 |
| 4,874,566 | 10/1989 | Heuschkel | 264/DIG. 69 |
| 5,032,072 | 7/1991 | Heuschkel | 264/DIG. 69 |

*Primary Examiner*—Mathieu D. Vargot
*Attorney, Agent, or Firm*—Barnes & Thornburg

[57] ABSTRACT

This invention relates to automating a process for manufacturing articles from plastic, particularly recyclable plastic waste. A lengthened separator head is flanged to a plasticizer to supply melting serially to several molds, by way of mold inlet shut-off mechanism. A preprogrammed control device monitors the filling of a respective mold by way of a pressure sensor in the mold. When the desired filling of the mold has occurred, the inlet shut-off mechanism is closed by the control device and another mold that is ready to be filled is filled with melting by the opening of the corresponding inlet shut-off mechanism at the another mold. In addition, the control device controls the locking and tightening of the mold as well as its opening and emptying.

69 Claims, 10 Drawing Sheets

MECHANISM FOR THE AUTOMATIC MANUFACTURING OF ARTICLES MADE FROM PLASTIC, PARTICULARLY FROM RECYCLABLE PLASTIC

BACKGROUND AND SUMMARY OF THE INVENTION

This invention relates to a process and a mechanism for the automatic manufacturing of articles made from plastic, particularly recyclable plastic waste. The mechanism comprises several stationary divided compression molds flanged to a plasticizer. Each of the divided compression molds is locked in a closed position during the process. The locking function allows for a tight closing of the flanged divided molds.

The processing of the plastic material takes place in a plasticizer which may be constructed as a screw-type extruding machine or as a roller-type extruding machine. The weight of the very viscous melting is determined with respect to the size of the object to be molded and then the melting is pressed in a mold. In another arrangement constructed for this purpose, the melting may also be filled directly from the plasticizer into a mold, in which case a sensor can measure the filling pressure in order to ensure that the mold is filled.

In order to let the plasticizer operate continuously, a separator head is connected and disconnected sequential to each of the several molds by means of an inlet shut-off mechanism. Nevertheless, a considerable number of operating sequences are necessary which must be carried out manually and which therefore result in considerable expenditures.

A locking and opening mechanism for a plastics mold is disclosed in the European Patent Document 0 221 872 A2. There a hydraulic cylinder pivotedly arranged on a lower mold half to lift off the upper mold half, whereby the opening and closing of the plastics mold is achieved. Another hydraulic cylinder, which is disposed on the upper mold half, is articulated with a double-armed lever which is rotatably disposed on the upper mold half. The lever carries a disk-shaped closing body on its other free end. This closing body extends behind a projection, which is fixedly connected with the lower mold half, whereby the plastics mold can be locked in the closed position.

The closing motion of the mold can be stopped by means of a limit switch. This mechanism can only be used for plastics molds of fairly small dimensions. In the case of larger molds, a lifting-off of the upper mold must have as horizontal a movement as possible to avoid damage to the molded article. This is true during the removal from the mold as well as during the tightening of the locking mechanism in order to withstand the high filling pressure of the mold.

The U.S. Patent Document U.S. Pat. No. 4,643,663 describes a divided mold, wherein the movable mold half is brought into a closing or emptying position by means of one or several hydraulic cylinders. However, a locking and tightening of the locking is not provided. Hence that arrangement is not suitable for large molds filled with recyclable plastics.

In contrast, European Patent Document EU-PS 381 770 A1 shows a mold where the movable mold half is brought into its open and closed positions by four threaded spindles which correspond with an equal number of lift nuts which are rotatably but vertically unshiftingly disposed in the movable mold half and which are driven synchronously by a gear motor. Here there is no locking and no tightening of the two mold halves so that this construction is also not suitable for the manufacturing of large-surface articles made of recyclable plastics.

It is an object of the invention to let all operating sequences—from the processing of the plastic material by means of the plasticizer, to the ejection of finished molded object—occur automatically in order to produce low-cost articles because of an efficient utilization of the mechanism. Also when used with large molds, the mold is a lockable in a tightenable manner in the closed position.

This object is achieved by means of the following sequence of process steps:

a) Mold release and indication of the readiness to be filled;
b) Opening of the locking mechanism on the separator head assigned to the mold;
c) Filling of the mold and refilling of a plunger device, which filling is indicated by filling pressure monitoring;
d) Closing of the locking mechanism on the separator head;
e) Subsequent pressing of additional melting into the mold by means of the plunger device;
f) Cooling of the mold;
g) Opening of the mold cover and removing the molding; and
h) Closing of the mold cover, locking, tightening and switching on the heater.

Several stationary molds can be connected to a separator head which is preferably flanged to the plasticizer. A shut-off mechanism is connected between the separator head and the mold.

The mold release and the filling readiness may be initiated by a pressure monitoring sensor which causes the opening of the inlet shut-off mechanism connected with the mold. The melting can then flow from the separator head directly into the corresponding mold. A plunger device which is arranged oppositely to the inflow opening of the mold may also fill up after the filling of the mold. The sensor monitors the filling pressure and cause the closing of the inlet shut-off mechanism as soon as the desired pressure is reached. However, at the same time, another inlet shut-off mechanism on the separator head leading to another mold is opened so that no delay occurs in the continuous ejection of the melting by the plasticizer.

As soon as the inlet shut-off mechanism of the latter, already filled, mold is closed, the additional pressing of melting into the mold, which is caused by the sensor, can take place by means of the plunger device. The pressing of melting into an already filled mold has the advantage that complicated molds, such as molds which tend to have bubbles or otherwise not completely filled contours of the articles, are filled in a perfected manner. The rate of rejections is reduced considerably.

In addition, the switching-on of the cooling device for the mold, may be carried out by a signal of the sensor. The mold can be emptied earlier if it is cooled. The cooling and intermediate heating of the mold may take place several times consecutively by means of the switching on and off of the corresponding heating and cooling devices. This has the advantage that the removal from the mold can take place in an easier and simpler manner.

In addition, the opening of the mold may take place within a predetermined time interval by means of a control device and the molding may be removed from the mold at the same time.

The molding may be ejected onto a conveyor belt, which is not shown, and may be transported away.

In addition, the closing of the mold cover and the intermediate heating of the mold may be caused by a signal of the control device. A sensor may signal the readiness of the emptied mold to be filled.

The mechanism for carrying out the process comprises a plasticizer, a separator head with several blockable inlets to the individual molds, with one afterpressing device for each mold for the adding of additional melting to the individual molds.

a) The separator head may be lengthened in a linearly elongated manner;

b) the intermediate pieces between the inlets and the plasticizer may be heatable by means of an additional heater; and c) the plasticizer may be constructed as a screw-type extrusion machine or as a roller-type extrusion machine.

The possibility therefore exists of also transporting the prepared melting along a longer path to the individual molds and to therefore connect a plurality number of molds to one separator head.

In addition, a melting delivery pump may be connected between the plasticizer and the separator head. A pressure of approximately 400 bar will sometimes be required, for a complete filling of the mold with melting, in the case of a separator head which is linearly lengthened in the manner of a strand and has several individual molds flanged to it. Here a melting delivery pump may be constructed as a gear pump. At the end of the separator head, which is linearly lengthened in the manner of a strand, a pressure of approximately 100 bar is still required for the filling of the mold. The end of the separator head may be closed off by means of a shut-off mechanism which, if required, may be switched to a flow-through position, should there be a disturbance in the course of the manufacture.

In addition, the shut-off mechanism may be constructed as an electrically actuated rotary disk valve, or may also be designed as a needle shut-off nozzle. These two shut-off devices have been successful in practice. However, the shut-off mechanism may also be constructed as an electrically or hydraulically operable shut-off slide valve.

Furthermore, the molds may form a unit with the pertaining shut-off mechanism and may be flanged to the linearly elongated separator head. A compact construction may be achieved in this manner.

In an advantageous development of the invention, a plunger device for a subsequent pressing of additional melting into the mold may be arranged on every mold. This plunger device is arranged diametrically with respect to the inlet opening for the melting on every mold and has the result that, after the desired filling pressure in the mold has been reached and the inlet shut-off mechanism is then shut, a predetermined amount of melting is then additionally pressed into the mold in order to compensate for possible bubbles or incompletely filled contours of the molding, particularly in the case of fairly large and complicated molds. The plunger devices fill with melting which has flown through the mold and are caused by a sensor to press this melting back into the mold in a recirculating manner.

In addition, a controllable heating and cooling device may be connected to every mold. During the cooling operation, this device is frequently connected and switched on. This not only accelerates the cooling operation but also considerably facilitates the removal from the mold.

Also, the intermediate pieces between the outlets on the separator head may have an additional heater. As a result, heat losses are compensated in the case of the flow through the separator head to the molds arranged at the end of this separator head, which is linearly lengthened in the manner of a strand.

In addition, the molds may be equipped with a sensor which closes the shut-off mechanism when the desired pressure is reached in the mold.

A control device may be arranged for each mold which causes the subsequent pressing of additional melting into the already filled mold.

In addition, the control device can switch the heater to cooling in a time-staggered manner and, after a certain time interval, may cause the opening of the mold cover and the removal of the molding from the mold. In this case, the moldings may be ejected onto a conveyor belt or may be removed manually.

Furthermore, the control device may cause the closing of the mold cover. The opening and closing may take place hydraulically.

In addition, the control device may signal the release of a molded product and the closing of the mold at the inlet shut-off mechanism. By means of a preprogrammed control sequence, the emptied and closed mold may again be included in the operating cycle. The automatic sensor monitoring device reports to the control device when a mold is free for filling. Each of the molds may be designed differently, and the plasticizer should have a capacity of approximately 200 to 250 kg/h.

Another mechanism for carrying out this process comprises a plasticizer, a separator head with several inlet shut-off mechanism for the individual molds. The molds are equipped with one heating and cooling device respectively and one afterpressing device respectively for the subsequent filling of additional melting into the individual molds.

In order to reduce the length of the arrangement and to avoid a cooling of the melting in an excessively extended separator head, the separator head, particularly in the case of smaller individual molds, may have a circular construction. There, each of the molds with their inlet shut-off mechanism are flanged to the separator head in a star-shaped manner.

A mechanism for the automatically closing, locking and tightening as well as opening of the divided mold is provided by a programmable central control. The mold is in two pieces—a firmly anchored lower mold half in a lower supporting frame and an upper movable mold half arranged in an upper supporting frame. Opening and closing of the mold takes place in the perpendicular direction. This mechanism is more advantageous for the removal of the molded article from the mold.

Furthermore, a yoke bridge or at least a threaded spindle may be fastened to the lower supporting frame. The yoke bridge is used for accommodating a working cylinder or lift nuts for the moving of the upper supporting frame which supports the movable mold half. If the threaded spindles are fastened to the lower supporting frame, the lift nuts are installed in the movable mold half or are installed in the upper supporting frame. The lift nuts are rotatably but vertically unshiftingly disposed in the above-mentioned parts and are synchronously driven by a gear motor.

However, the threaded spindles may also be fixedly connected with the upper supporting frame. Here, the lift nuts are rotatably but vertically unshiftingly disposed in the yoke bridge and are driven synchronously by a gear motor.

The gear motor or the operating cylinder may be shut-off by a stop switch. In order to ensure a certain contact pressure in the end positions of the closing and emptying position, the gear motor may be equipped with a torque coupling.

Moreover, the locking elements may mesh in tightening devices when the mold halves are closed, whereby the two closed mold halves become firmly locked and braced with respect to one another.

The locking elements can be actuated by one or more hydraulic cylinders or by a lever arrangement. The operation of the actuators can be automatically controlled and coordinated with the mold coolers so that the degree of cooling of the filled mold can be determined.

The moveable supporting frame together with the upper movable mold may slide in a guide way attached to the mold frame. This provides necessary meshing accuracy between the mold halves in the closed position.

The locking elements may be tightened by means of tightening devices arranged on the movable mold half. The tightening devices may consist of eccentric shafts moved by a hydraulic cylinder.

Locking bolts may be arranged on the upper mold half. The locking bolts may have semicircular recesses for cooperation with locking mechanism of the lower mold half or the mold frame.

Hydraulically rotatable locking shafts may be arranged on the lower mold half. The locking shafts may have milled-out recesses which correspond to the recesses in the locking bolts. A locking of the two mold halves as well as a tightening of the locking can also be achieved by means of this mechanism.

Alternatively, the locking bolts may have a ring groove in an end area that cooperates with a slidably arranged locking frame disposed on the lower mold half or on the lower supporting frame. This locking frame can be operable either hydraulically or pneumatically. The locking frame has bores which correspond to the locking bolts and which are expanded to form oblong holes. The expanded oblong hole portion being smaller in its inner width than the bore. By shifting of the locking frame when the mold halves are closed, the lateral portions of the narrower oblong hole engage the ring grooves of the locking bolts. By means of a slanting of the lateral portions of the oblong holes engaging in the ring grooves, a tensioning of the two mold halves may be achieved.

According to another embodiment, grooves, preferably in a ring shape, may be arranged in the area of the mold seam of the two mold halves. This grooves become narrower toward the inside of the mold and reach over the mold seam. Links, which have the same geometrical shape as the grooves, can be moved in and out of these grooves by means of a moving element. The moving element may be operated hydraulically, pneumatically or mechanically by way of an eccentric lever or by way of a toggle joint. As a result, it is possible to control the locking elements from a central control. The flanks of the groove may narrow down by a central angle of approximately 14°. With a bipartition angle of approximately 7°, the selflocking will stop so that the link will not bind in the groove and can be easily moved. The link itself may also be conically formed in the same central angle, specifically on the outer contour of the conical part. This allows for tightening of the connection of the two mold parts.

Also, a feed head and a cut-off slide may be arranged on the lower mold half. This has the advantage that when the inlet filling valve is closed, the melting, which is subjected to a high filling pressure, cannot continue to flow and lead to disturbances during the subsequent filling operation.

Finally, the timing of the drive assemblies can be controlled from the central control.

Naturally, a fully automatic operation of the system also includes the automatic removal of molded articles from the mold. The articles removed from the mold can be ejected to a conveyor belt which is not shown.

Other objects, advantages and novel features of the present invention will become apparent from the following detailed description of the invention when considered in conjunction with the accompanying drawings.

DETAILED DESCRIPTION OF THE DRAWINGS

Figure 1:
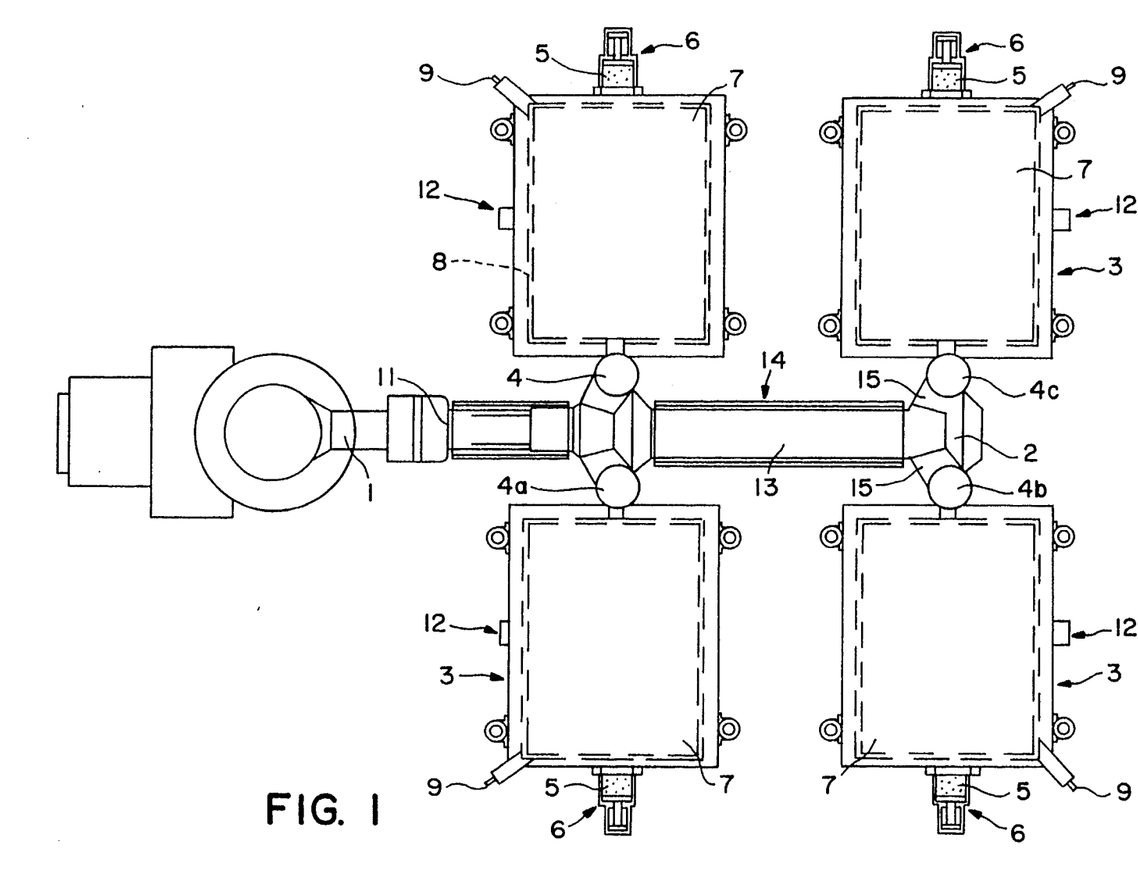
FIG. 1 is a top view of a mechanism with a separator head lengthened in a linearly elongated manner.
Figure 2:
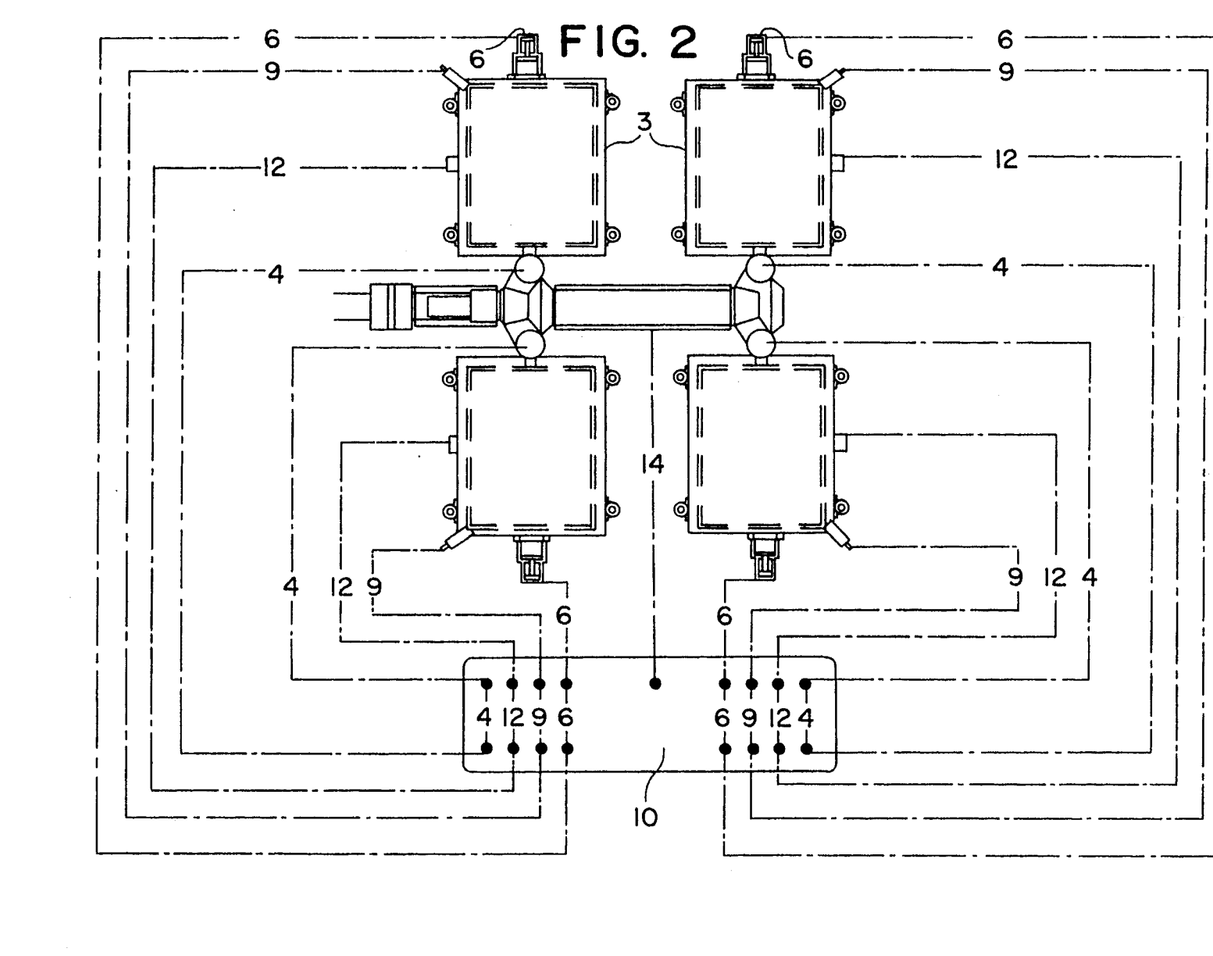
FIG. 2 is a connection diagram of the control mechanism of the mechanism of FIG. 1.

As illustrated in FIG. 1, the arrangement comprises a plasticizer 1 to which a separator head 2 (which is lengthened in a linearly elongated manner) is flanged. A screw-type extruder or a roller-type extruder may be used as the plasticizer 1. The various molds 3 are connected to the lengthened separator head 2 by way of inlet shut-off mechanisms 4, 4a, 4b, 4c. When an inlet shut-off mechanisms 4, 4a, 4b, 4c is opened, melting 5 is allowed to flow into the corresponding mold 3 to fill the mold and also flows through this mold 3 to fill the plunger device 6 which is arranged diametrically to the inlet opening shut-off mechanisms 4, 4a, 4b, 4c of the mold 3. When the desired filling pressure has been reached, a sensor 9 will signal that the filling of the mold 3 is achieved, and the respective shut-off mechanism 4, 4a, 4b, 4c is then closed by means of the control device 10 (FIG. 2). Immediately after the closing of a respective inlet shut-off mechanism 4, 4a, 4b, 4c, the control device 10 has the effect that the plunger device 6 additionally presses the stored melting 5 therein into the already filled mold 3. Each mold 3 is equipped with a heating and cooling device 12. This heating and cooling device 12 is reversible; that is it may operate as a heating device as well as a cooling device.

As soon as the mold 3 is ready for filling the heating takes place to allow easy ingress of the plastic melting and after the mold is filled and its respective inlet shut-off mechanism 4, 4a, 4b, 4c is closed, cooling takes place. This cooling change has the result that it will be easier to remove the molding 8 from the mold 3. After a certain time interval has passed and the mold 3 has cooled down, the control device 10 then causes an opening-up of the upper mold cover 7, whereupon the molded product 8 is ejected. This molded product 8 may be removed manually or may be fed to a conveyor belt (not shown).

As soon has the inlet shut-off mechanism 4 has been closed for one mold 3, another inlet shut-off mechanism 4a–c will open up so that the melting 5 can be fed to another mold 3. The intermediate piece 13, connecting the separator heads 2 to be lengthened in a linearly elongated manner, may be heated by an additional heater 14 so that no heat loss of the melting 5 can occur before the molds 3 are filled. Each of the molds 3 may have a different design. The arrangement may be utilized in obtaining various shaped moldings.

The diagram of connections of FIG. 2 illustrates a control device 10 which controls the opening and closing of the inlet shut-off mechanisms 4, 4a, 4b, 4c to the molds 3. Another controllable connection is linked with the heating and cooling device 12 for automatically controlling the heating and cooling of the molds 3 after a predetermined time interval. In addition, the control device 10 is connected with a sensor 9 which, on the one hand, measures the filling pressure in the mold 3 and, on the other hand, is connected with the inlet shut-off mechanisms 4, 4a, 4b, 4c to close the latter as soon as the desired filling pressure is reached in the mold 3. The sensor 9 also signals the opening of the mold cover 7, the removal of the molding 8, the closing of the mold cover 7, and the fact that a particular mold may be in condition to be filled. The operation of the plunger device 6 is started according to the automatic program as soon as the desired filling pressure has been reached, and the shut-off mechanism of the concerned mold 3 is closed.

Figure 3:
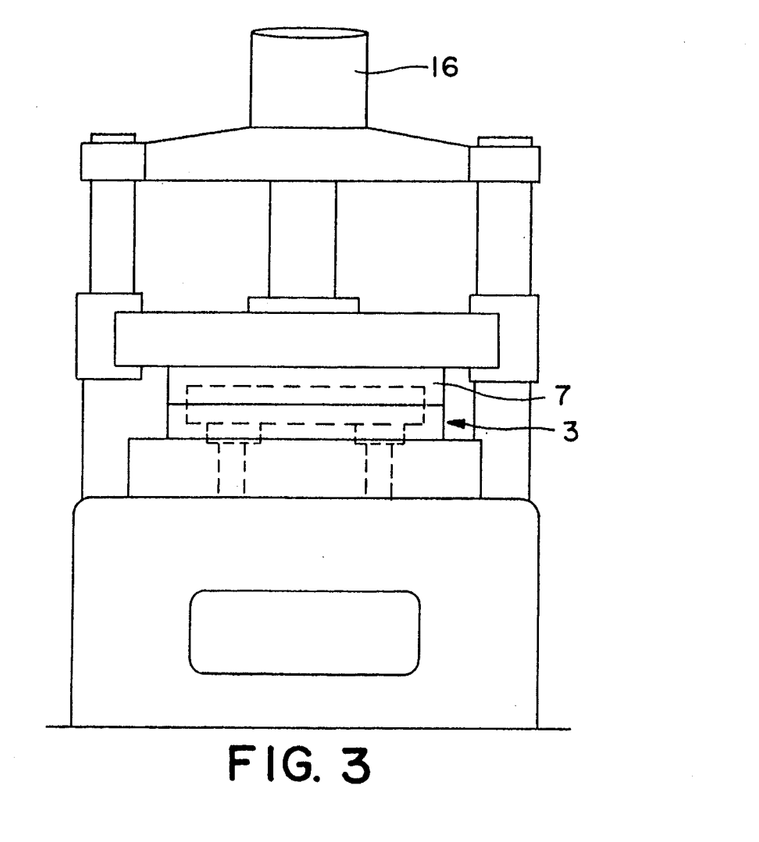
FIG. 3 is a view of a casting mold in the closed condition.

FIG. 3 illustrates a closed mold 3. There the top mold cover 7 is held in the filling and closed position by means of a hydraulic device 16.

Figure 4:
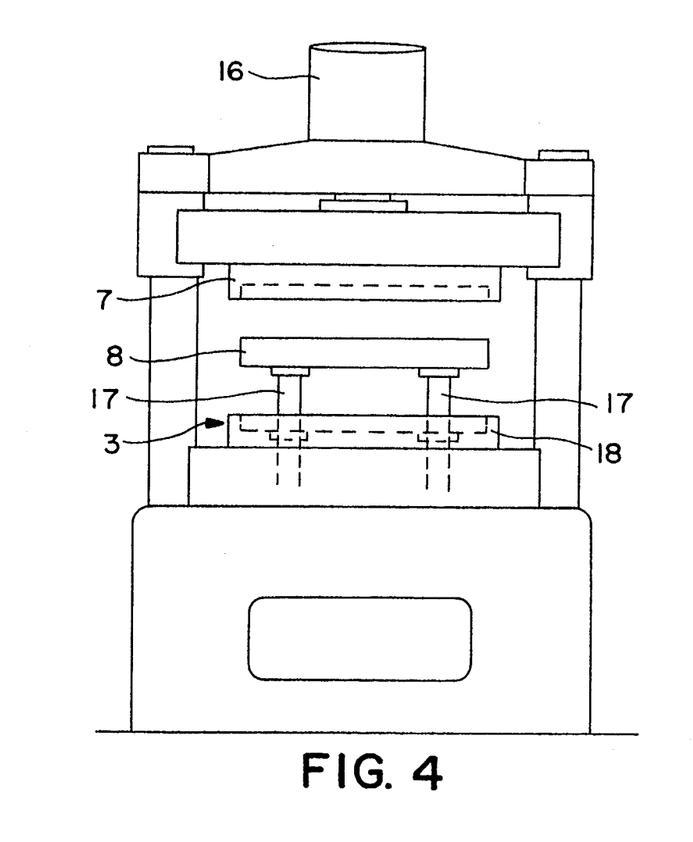
FIG. 4 is a view of a casting mold in the open condition.

FIG. 4 shows a mold 3 in its open position. There the ejector slides 17 have taken a finished molding 8 out of the bottom part 18 of the mold. The molding 8 can now be removed by hand, but may also be ejected onto a conveyor belt by means of a device which is not shown.

Figure 5:
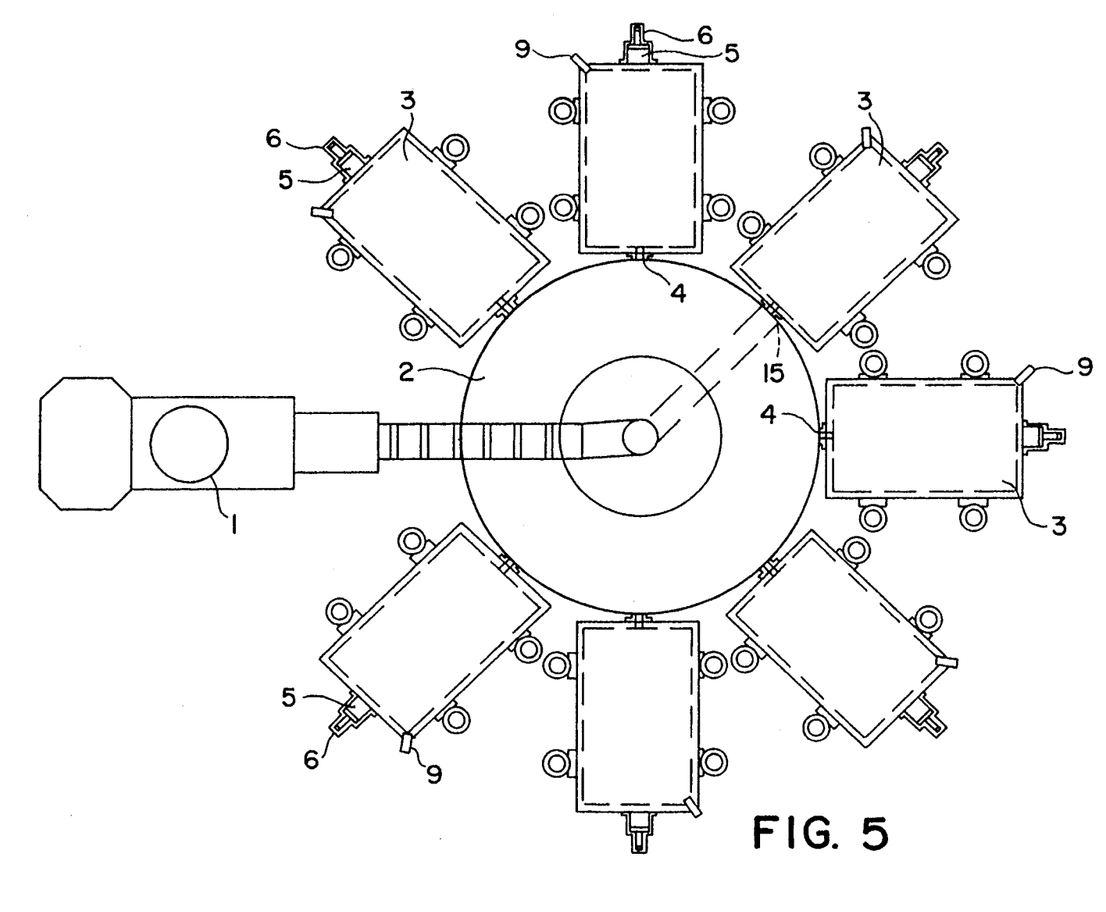
FIG. 5 is a view of an alternative mechanism to FIG. 1, wherein a circular separator head is provided with molds which are flanged to it in a star-shaped manner and showing shut-off mechanisms.

FIG. 5 illustrates another construction of the separator head 2. Here the separator head 2 has a circular design. Outlets 15 for or the flanged inlet shut-off mechanisms 4 along with the molds 3 are arranged in a star-shaped manner with respect to the separator head 2. This has the advantage of a compact construction and insures that the melting 5 does not lose its heat very rapidly. An additional heater 14 is hardly necessary here. The equipping of the molds 3 and their control is the same as was illustrated and described in FIG. 2. This arrangement is advantageous in the case of smaller complicated molds 3.

Figure 6:
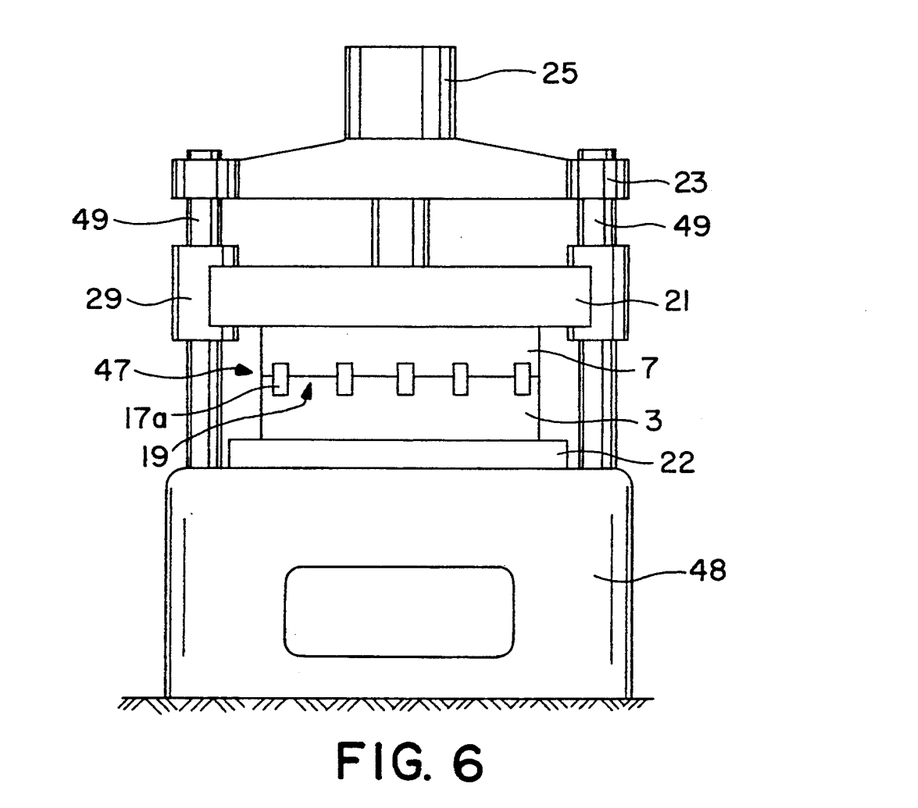
FIG. 6 is a schematic representation of a plastics molding system with a closed and locked mold.

The plastics molding system illustrated in FIG. 6 comprises a frame stand 48 which carries a lower mold supporting frame 22 on which is secured the stationary bottom of the mold 3. A yoke bridge 23 is fastened to the frame stand 48 and carries the upper supporting frame 21 which supports and carries the upper movable mold cover 7. A working cylinder 25 is mounted on the yoke bridge 23 and is connected to the upper supporting frame 21 to bring the upper mold cover 7 into a closing and emptying position 19, 20, respectively (see FIGS. 6 and 7). The upper supporting frame 21 rides with a guide 29 that slides on the columns 49 of the yoke bridge 23 so that the upper movable mold cover 7 is brought precisely into the closed position 19. Locking and tightening devices 17a are arranged on the mold 3.

Figure 7:
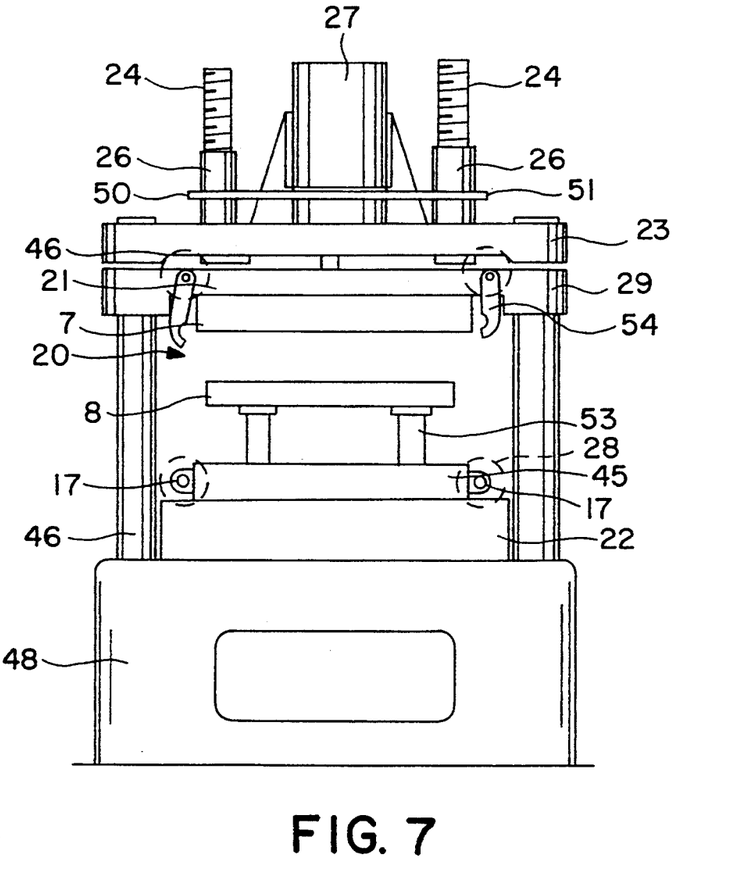
FIG. 7 is a view of another mold embodiment shown in the emptying position.

FIG. 7 shows another embodiment of a plastics molding system. Preferably four threaded vertically movable spindles 24 are fastened in the upper supporting frame 21 to engage lift nuts 26 that are rotatably but vertical unshiftingly disposed in the yoke bridge 23. The lift nuts 26 are each provided with a driving wheel 50. The driving wheels 50 are connected with one another by means of driving elements 51 such as a gear chain and are connected to a gear motor 27 (see also FIG. 8). The gear motor 27 is designed for clockwise and counter-clockwise rotation. Thus, the upper movable mold cover 7 may be brought into the closed position 19 and into the emptying position 20 by engagement of the threaded spindles 24 with the rotatable but non-vertically moving lift nuts 26 that cause the spindles 26 and the attached upper mold 7 frame 21 to be raised and lowered as the nuts 26 are rotated. Limit switches 46 are provided to control the motor 27 to limit the lift or drop of the frame by disconnecting power to the motor when the frame reaches either its open or closed position. Between the gear motor 27 and the driving elements 51 is a torque coupling 52. The torque coupling allows a certain contact pressure to be achieved in the end positions of the upper movable mold cover 7. It is only after the torque coupling 52 disengages that the limit switch 46 is operated. Ejector slides 53 are provided to automatically lift the molding 8 out of the mold 3 in the emptying position 20. The molding is then placed onto a conveyor belt which is not shown.

Figure 8:
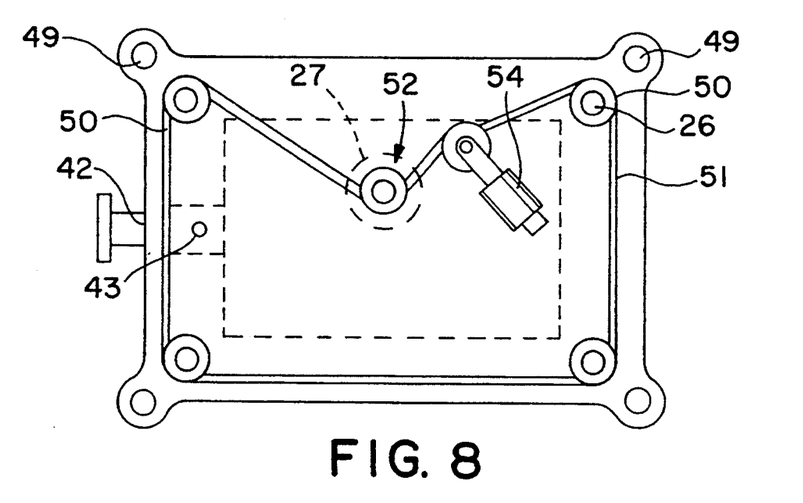
FIG. 8 is a top view of FIG. 7.

FIG. 8 illustrates a drive arrangement of the threaded spindles 24 with the lift nuts 26. By means of the driving elements 51, a gear motor 27 drives the lift nuts 26 by way of the driving wheels 50. A tensioning device 54 for the driving elements 51 causes a uniform movement of the lift nuts 11.

Figure 9:
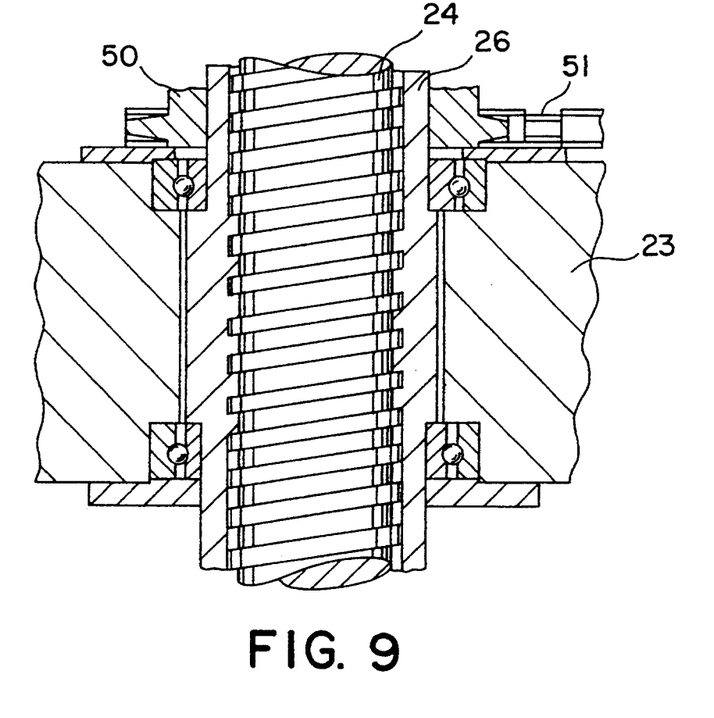
FIG. 9 is a cutout view of a lift nut bearing in the yoke bridge of the FIG. 7 mold embodiment.

FIG. 9 shows a cut-out cross-sectional view of the bearing of a lift nut 26 in the yoke bridge 23 to illustrate the rotative but non-vertical mounting of the lift nut 26 in yoke bridge 23.

Figure 10:
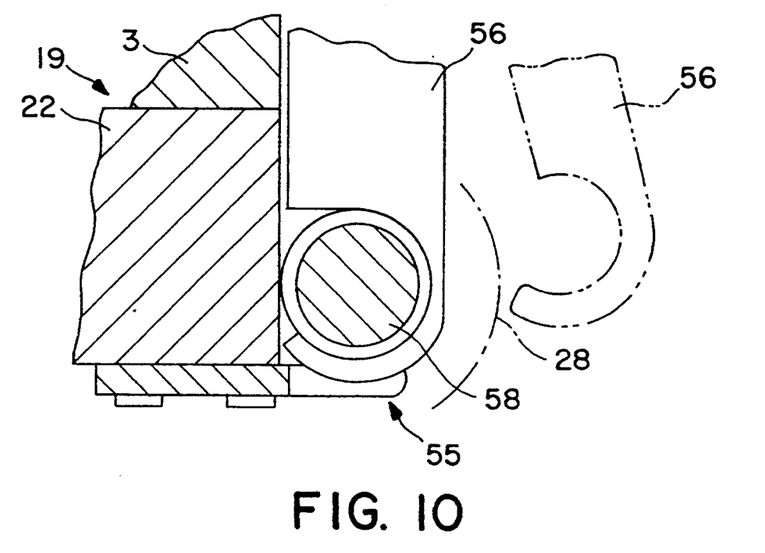
FIG. 10 is a side view of a locking mechanism for a mold with a tightening device.

As illustrated in FIGS. 7 and 10, the locking mechanism 55 comprises locking elements 56 which are pivotedly mounted to the upper movable mold cover 7, or the upper supporting frame 21 and which can be pivoted away by means of a controllable hydraulic cylinder 28 so that the locking elements 56 can reach around an eccentric shaft 58 arranged on the mold 3, or the support frame 22. This eccentric shaft 58 is used as a tightening device 17. Rotation of the eccentric shaft 58 by a hydraulic cylinder 28, causes the locking elements 56 to be tightened, whereby a tight fit is achieved in the closed position 19 of the mold 3.

Figure 11:
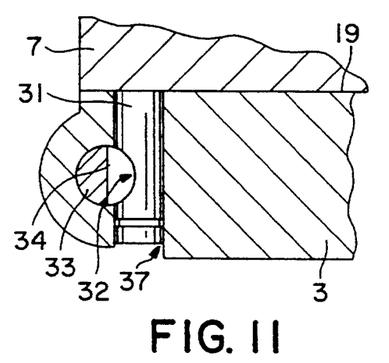
FIG. 11 is a view of a first alternative construction of a locking mechanism with locking bolts in an unlocked condition.
Figure 12:
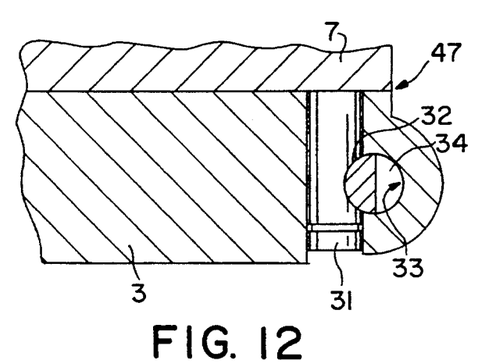
FIG. 12 is a view of the embodiment of FIG. 11 but with the bolts in the tightened locking condition.

FIGS. 11 and 12 show a respective alternative tightening and locking solution. In this embodiment, locking bolts 31 are secured in the upper movable mold cover 17 and engage in bores 37 of the lower non-moveable portion of the mold 3 in the closed position 19. The locking bolts 31 have a semicircular recess 32 thereon. This recess 32 is openly directed toward the outside to align with semicircular milled-out recesses 34 which are arranged on locking shafts 33 also carried by the lower portion of the mold 3. The locking shafts 33 are disposed in the mold 3 in such a manner that their recesses 32 are situated slightly above the semicircular recesses 32 of the locking bolts 31. When the locking shafts 33 are rotated the solid portion of the locking shaft 33 (at the milled-out recess 34) freely enters into the recess 32 of the locking bolt 31. A tightening rotation of the locking bolt 31 causes the solid portion of the locking bolt to engage the lower portion of the recess 32 and downwardly drive the pins 31 to cause the movable mold cover 7 to be snugly closed.

Figure 13:
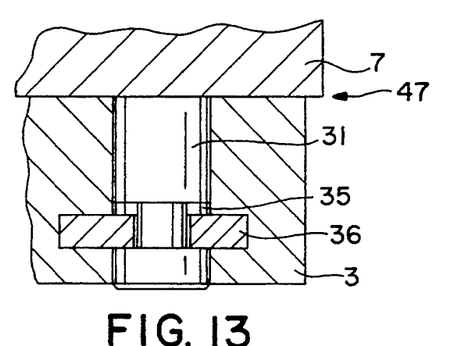
FIG. 13 is a view of a second alternative locking mechanism with a locking frame.

FIG. 13 shows another locking arrangement. In this case, the locking bolts 31 are provided with a ring groove 35. A locking frame 36 disposed on the lower portion of the mold 3 to engage in these ring grooves 35 to hold the mold closed.

Figure 14:
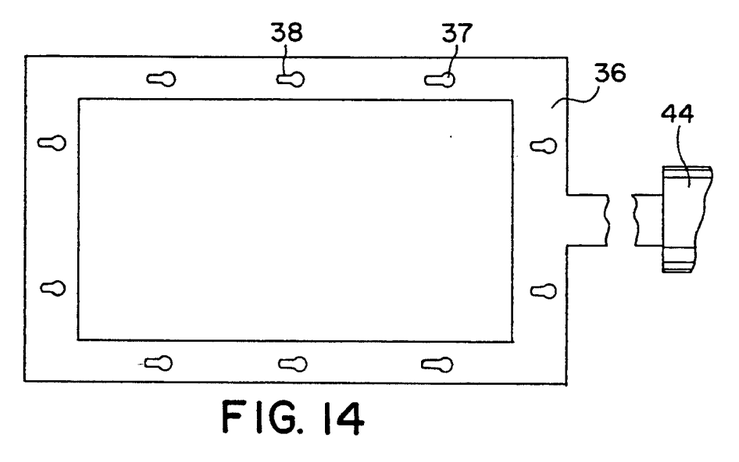
FIG. 14 is a plan view of a locking frame of FIG. 13.

As illustrated in FIG. 14, bores 37 are arranged in the locking frame 36 which correspond with the locking bolts 31. The bores 37 are expanded to form oblong key holes 38 whose inner width is smaller than the diameter of the locking bolts 31. The locking bolts 31 are provided with a ring groove 35 in their end area. The lateral portions of the oblong key holes 38 engage in this ring groove 35 when the locking frame 36 is shifted into the corresponding direction by means of a drive assembly 44. The lateral portions of the oblong holes 38 may have a slanted cam design so that when the locking frame 36 is shifted, a caming action takes place on the bottom side of the locking bolt to force it downwardly to provide a tightening of the closed mold 3.

Figure 15:
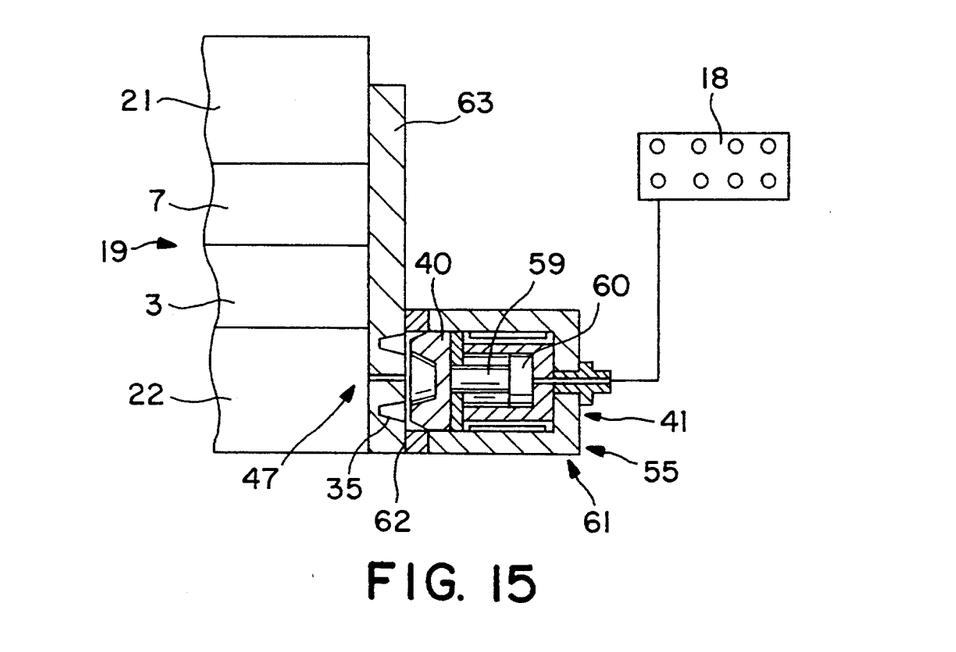
FIG. 15 is a sectional view of a third alternative locking element in the open position.
Figure 16:
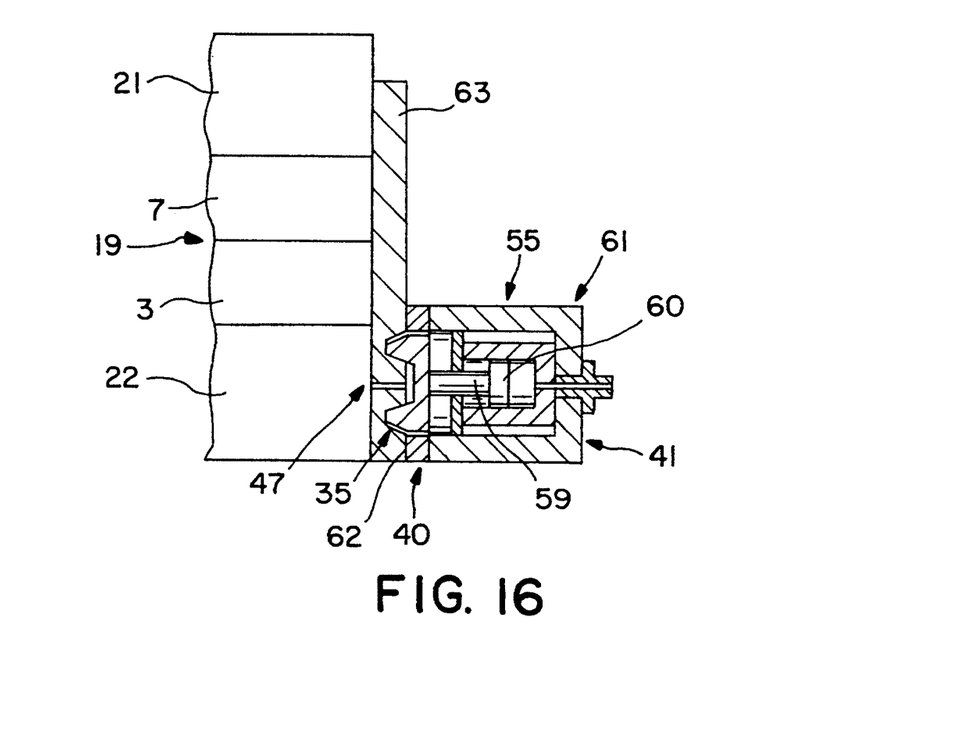
FIG. 16 is a view of the embodiment of FIG. 15 but with the locking mechanism in a locked position.

In the arrangement shown in FIGS. 15 and 16, the locking mechanism 55 comprises a actuating element 41 for a movable link 40 arranged in the area of the mold seam 47. This actuating element may be operated hydraulically or pneumatically from a central control 18. The movable link 40 is arranged on an operating piston rod 59. The end of the link is formed as a cup-shaped ring. The link 40 has a cup-shape end formed to be conically for engaging ring shape groove 35 to be described later. The radius of curvature is conical and the cup-shape ring is smaller than that of the ring groove 35. The central angle of this cone amounts to approximately 14° so that no selflocking occurs when the link 40 engages in the ring groove 35. The actuating element 41 together with the plunger 60, which directly operates the operating rod 59 and the link 40, is located in a housing 61 for purposes of protection. A U-shaped connecting part 62 is arranged on the mold 3 with a bracket 63 which is fastened to the upper movable mold cover 7. In the closed position 19, a clearance of approximately 2 mm exists between the bracket 63 and the U-shaped connecting part 62.

This clearance is required for the tightening when the link 40 is pressed into the ring groove 35. There is only a line contact in the ring groove 35. There is an areal contact of the link 40 and the edge of the ring groove 36 before the final stage of movement of the link 40. The final movement of the link drives the bracket 63 downward to provide tightening. The bracket 63 and the connecting part 62 are arranged in an adjustable manner.

Figure 17:
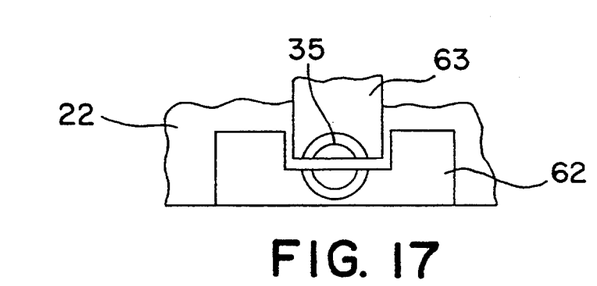
FIG. 17 is a partial view of the locking mechanism of FIG. 15 showing the mold halves closed, but without a locking element.

FIG. 17 is a partial cut-out in the area of the locking mechanism 55 in the closed position 19 to clearly show the U-shaped area of the connection part 62. The lower supporting frame 22 supports the lower non-movable portion of the mold 3. The locking element 56 is preferably fastened to the lower supporting frame 22 while the bracket 63 may be fastened on the upper mold cover 7 or on the upper supporting frame 21. The bracket 63 engages in the "U" portion of U-shaped connecting part 62. As soon as the mold 3 is in the closed position 19, the groove parts of the bracket 63 and of the connecting part 62 complement one another—in this case, into a ring shape—which coincides with the shape of the link 40. The clearance between the bracket 63 and the connecting part 62 amounts to approximately 2 mm.

Figure 18:
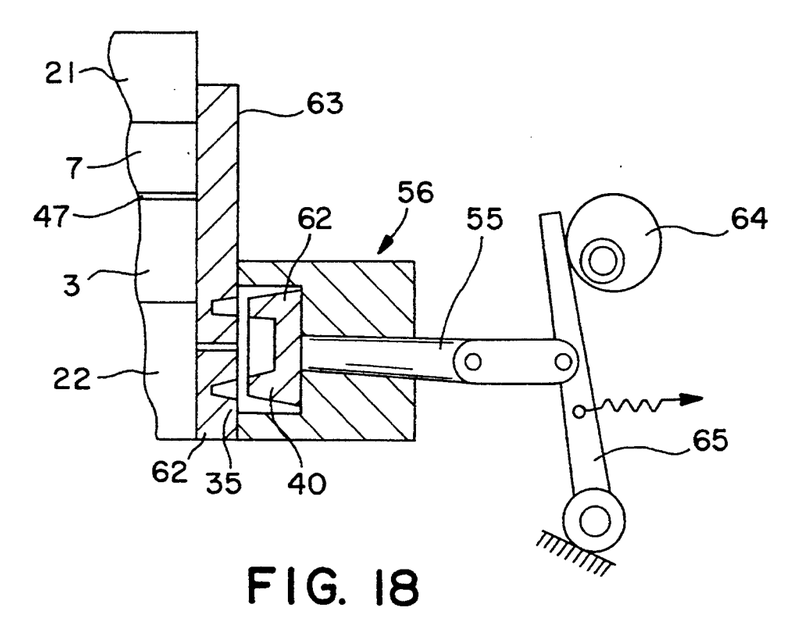
FIG. 18 is a mechanical operating mechanism for the locking mechanism of FIG. 15.

FIG. 18 shows an alternative to the hydraulic piston 60 of the FIGS. 15, 16 species. Here movement of the ring shape part 40 is caused by a mechanical connection using a lever 65 operated by an eccentric 64.

Naturally, there are other possibilities but these are included in the claimed combination of a moving mechanism and a locking mechanism with a tightening device.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. A mechanism for producing a plurality of articles out of plastic, comprising:
   a) a plurality of molds having multi-parts,
   b) a plasticizer for providing melting for the molds,
   c) a stationary separator head having an inlet connected to the plasticizer to receive the melting and having several blockable outlets, with each outlet leading melting to one of the plurality of the individual molds,
   d) multiple blocking means, one for each one of the several outlets to open an outlet from the separator to allow melting to be directed into one of the molds and to close the outlet to stop melting from being directed from the separator to the same mold, and e) central control means to cyclically and sequentially open one outlet to permit filling of one mold and upon filling thereof, to close that outlet and open another outlet to permit filling of another mold.

2. A mechanism according to claim 1, wherein there is a melting delivery pump connected between the plasticizer and the separator head.

3. A mechanism according to claim 2, wherein the blocking means comprises a separate mold inlet shut-off mechanism for each mold for connecting the plasticizer to the mold and which shut-off mechanism is formed as an electrically actuated rotary slide valve.

4. A mechanism according to claim 2, wherein the blocking means comprises a separate mold inlet shut-off mechanism for each mold for connecting the plasticizer to the mold and which shut-off mechanism is formed as a needle shut-off nozzle.

5. A mechanism according to claim 2, wherein the blocking means comprises a separate mold inlet shut-off mechanism for each mold for connecting the plasticizer to the mold and which shut-off mechanism is formed as a shut-off slide valve.

6. A mechanism according to claim 3, wherein each of the molds form a unit with a pertaining shut-off mechanism and are flanged to the separator head.

7. A mechanism according to claim 4, wherein each of the molds form a unit with a pertaining shut-off mechanism and are flanged to the separator head.

8. A mechanism according to claim 5, wherein each of the molds form a unit with a pertaining shut-off mechanism and are flanged to the separator head.

9. A mechanism according to claim 6, wherein a plunger device is arranged on every mold for the subsequent pressing of additional melting into the mold.

10. A mechanism according to claim 7, wherein a plunger device is arranged on every mold for the subsequent pressing of additional melting into the mold.

11. A mechanism according to claim 8, wherein a plunger device is arranged on every mold for the subsequent pressing of additional melting into the mold.

12. A mechanism according to claim 9, wherein a controllable heating and cooling device is provided for every mold.

13. A mechanism according to claim 10, wherein a controllable heating and cooling device is provided for every mold.

14. A mechanism according to claim 11, wherein a controllable heating and cooling device is provided for every mold.

15. A mechanism according to claim 12, wherein there is a intermediate piece between the separator head and the blockable outlets which is provided with a heater.

16. A mechanism according to claim 13, wherein there is a intermediate piece between the separator head and the blockable outlets which is provided with a heater.

17. A mechanism according to claim 14, wherein there is a intermediate piece between the separator head and the blockable outlets which is provided with a heater.

18. A mechanism according to claim 15, wherein an end of the molds located away from the mold inlet is equipped with a sensor that closes the associated mold inlet shut-off mechanism when a desired pressure is reached in the mold.

19. A mechanism according to claim 16, wherein an end of the molds located away from the mold inlet is equipped with a sensor that closes the associated mold inlet shut-off mechanism when a desired pressure is reached in the mold.

20. A mechanism according to claim 17, wherein an end of the molds located away from the mold inlet is equipped with a sensor that closes the associated mold inlet shut-off mechanism when a desired pressure is reached in the mold.

21. A mechanism according to claim 18, wherein a control device is provided to cause the plunger to provide a subsequent pressing of the additional melting into the already filled mold after the mold inlet is closed.

22. A mechanism according to claim 19, wherein a control device is provided to cause the plunger to provide a subsequent pressing of the additional melting into the already filled mold after the mold inlet is closed.

23. A mechanism according to claim 20, wherein a control device is provided to cause the plunger to provide a subsequent pressing of the additional melting into the already filled mold after the mold inlet is closed.

24. A mechanism according to claim 21, wherein the control device also switches the heating and cooling device for each mold into cooling condition in a time-staggered manner after the mold inlet shut-off mechanism is closed.

25. A mechanism according to claim 22, wherein the control device also switches the heating and cooling device for each mold into cooling condition in a time-staggered manner after the mold inlet shut-off mechanism is closed.

26. A mechanism according to claim 23, wherein the control device also switches the heating and cooling device for each mold into cooling condition in a time-staggered manner after the mold inlet shut-off mechanism is closed.

27. A mechanism according to claim 24, wherein the control device also causes the removal of the molded article from the mold after a certain interval of time has passed since causing the cooling of the mold.

28. A mechanism according to claim 25, wherein the control device also causes the removal of the molded article from the mold after a certain interval of time has passed since causing the cooling of the mold.

29. A mechanism according to claim 26, wherein the control device also causes the removal of the molded article from the mold after a certain interval of time has passed since causing the cooling of the mold.

30. A mechanism according to claim 27, wherein the control device causes a closing and tightening of the mold cover after removal of the molded article.

31. A mechanism according to claim 28, wherein the control device causes a closing and tightening of the mold cover after removal of the molded article.

32. A mechanism according to claim 29, wherein the control device causes a closing and tightening of the mold cover after removal of the molded article.

33. A mechanism according to claim 30, wherein a hydraulic mechanism closes the mold cover in response to an input from the control device.

34. A mechanism according to claim 31, wherein a hydraulic mechanism closes the mold cover in response to an input from the control device.

35. A mechanism according to claim 32, wherein a hydraulic mechanism closes the mold cover in response to an input from the control device.

36. A mechanism according to claim 33, wherein the control device signals the closing of the mold to the inlet shut-off mechanism to allow for opening thereof to begin a new molding operation.

37. A mechanism according to claim 34, wherein the control device signals the closing of the mold to the inlet shut-off mechanism to allow for opening thereof to begin a new molding operation.

38. A mechanism according to claim 35, wherein the control device signals the closing of the mold to the inlet shut-off mechanism to allow for opening thereof to begin a new molding operation.

39. A mechanism according to claim 1, wherein the separator head has a circular construction, and
   wherein the molds are flanged to the separator head by way of mold inlet shut-off mechanisms.

40. A mold mechanism according claim 1, wherein the mold comprises:
   a) cooperating upper and lower mold forms;
   b) a yoke bridge fastened to a lower mold supporting frame;
   c) the lower mold supporting frame supporting the lower mold form;
   d) upper mold form comprising a movable mold cover arranged to be supported in an upper supporting frame;
   e) the upper supporting frame being fixedly connected with at least one of a threaded spindle and a working cylinder for causing movement of the upper mold form through movement of the yoke bridge by at least one lift nut rotatably connected to the threaded spindle and vertically unshiftingly disposed in the yoke bridge, or by the working cylinder being directly connected to the yoke bridge, wherein rotation of the spindle by a drive motor or expansion of the working cylinder causes the upper supporting frame to move the upper mold form into closed contact with the lower mold form;
   f) wherein mold movement limit switches are provided to stop rotation of the gear motor or the working cylinder;
   g) wherein locking and tightening elements are provided to tighten and lock the two mold forms together;
   h) wherein the tightening and the locking elements are moved by at least one hydraulic cylinder which can be controlled with respect to its actuator;
   i) wherein the upper mold supporting frame together with the upper mold form slides in a guide way attached to the lower supporting frame.

41. A mechanism according to claim 40, wherein the locking and tightening elements cause the mold forms to be tightened against one another through the action of tightening devices arranged on the upper mold form.

42. A mechanism according to claim 41, wherein the tightening devices comprise eccentric shafts moved by a hydraulic cylinder.

43. A mechanism according to claim 42, wherein the locking and tightening elements comprise locking bolts arranged on the upper mold form.

44. A mechanism according to claim 43, wherein the locking bolts have a semicircular recesses.

45. A mechanism according to claim 44, wherein the locking bolts cooperate with hydraulically rotatable locking shafts arranged on the lower mold form.

46. A mechanism according to claim 45, wherein the locking shafts have semicircular milled-out areas which cooperate with the semicircular recesses in the locking bolts.

47. A mechanism according to claim 43, wherein the locking bolts have a ring groove in the end area.

48. A mechanism according to claim 47, wherein a slidably arranged locking frame is disposed on the lower mold form to cooperate with the locking bolts.

49. A mechanism according to claim 48, wherein the locking frame has bores connected to oblong holes which, holes engage the ring groove of the locking bolts in the locked condition of the mold.

50. A mechanism according to claim 49, wherein a drive assemblie for shifting the locking frame into locking position is provided and is controlled by a central control.

51. A mechanism according to claim 6 wherein the plunger device is open to the mold to receive the additional melting as the mold is filled.

52. A mechanism according to claim 7 wherein the plunger device is open to the mold to receive the additional melting as the mold is filled.

53. A mechanism according to claim 8 wherein the plunger device is open to the mold to receive the additional melting as the mold is filled.

54. A mechanism according to claim 1 wherein the separator head is linearly lengthened such that melting directed to at least one mold has a longer pathway to travel in the separator head than melting to another mold and wherein this longer pathway passes and extends beyond the inlet to another mold.

55. A mechanism according to claim 54 wherein there is a heater for the melting in the extended passageway.

56. A mechanism according to claim 54, wherein the blocking means comprises a separate mold inlet shut-off mechanism for each mold for connecting the plasticizer to the mold and which shut-off mechanism is formed as an electrically actuated rotary slide valve.

57. A mechanism according to claim 55, wherein the blocking means comprises a separate mold inlet shut-off mechanism for each mold for connecting the plasticizer to the mold and which shut-off mechanism is formed as an electrically actuated rotary slide valve.

58. A mechanism according to claim 54, wherein each of the molds form a unit with a pertaining shut-off mechanism and are flanged to the separator head.

59. A mechanism according to claim 55, wherein each of the molds form a unit with a pertaining shut-off mechanism and are flanged to the separator head.

60. A mechanism according to claim 56, wherein each of the molds form a unit with a pertaining shut-off mechanism and are flanged to the separator head.

61. A mechanism according to claim 57, wherein each of the molds form a unit with a pertaining shut-off mechanism and are flanged to the separator head.

62. A mechanism according to claim 54, wherein a plunger device is arranged on every mold for the subsequent pressing of additional melting into the mold.

63. A mechanism according to claim 55, wherein a plunger device is arranged on every mold for the subsequent pressing of additional melting into the mold.

64. A mechanism according to claim 56, wherein a plunger device is arranged on every mold for the subsequent pressing of additional melting into the mold.

65. A mechanism according to claim 57, wherein a plunger device is arranged on every mold for the subsequent pressing of additional melting into the mold.

66. A mechanism according to claim 62 wherein the plunger device is open to the mold to receive the additional melting as the mold is filled.

67. A mechanism according to claim 63 wherein the plunger device is open to the mold to receive the additional melting as the mold is filled.

68. A mechanism according to claim 64 wherein the plunger device is open to the mold to receive the additional melting as the mold is filled.

69. A mechanism according to claim 65 wherein the plunger device is open to the mold to receive the additional melting as the mold is filled.

* * * * *